United States Patent
Gan et al.

(10) Patent No.: US 11,522,905 B2
(45) Date of Patent: Dec. 6, 2022

(54) MALICIOUS VIRTUAL MACHINE DETECTION

(71) Applicant: International Business Machines Corporation, Armonk, NY (US)

(72) Inventors: Seng Chai Gan, Ashburn, VA (US); Stanley Bryan Hardter, Baldwinsville, NY (US); Adam Lee Griffin, Dubuque, IA (US); HuyAnh Dinh Ngo, Sterling Heights, MI (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 16/567,299

(22) Filed: Sep. 11, 2019

(65) Prior Publication Data
US 2021/0075797 A1    Mar. 11, 2021

(51) Int. Cl.
*H04L 9/40*    (2022.01)
*G06F 9/455*    (2018.01)
*G06F 9/54*    (2006.01)

(52) U.S. Cl.
CPC ........ *H04L 63/145* (2013.01); *G06F 9/45558* (2013.01); *G06F 9/542* (2013.01); *H04L 63/1416* (2013.01); *H04L 63/1466* (2013.01); *G06F 2009/45562* (2013.01); *G06F 2009/45587* (2013.01); *G06F 2009/45591* (2013.01); *G06F 2009/45595* (2013.01)

(58) Field of Classification Search
CPC ............... H04L 63/145; H04L 63/1416; H04L 63/1466; G06F 9/45558; G06F 9/542
See application file for complete search history.

(56) References Cited

U.S. PATENT DOCUMENTS

| | | | |
|---|---|---|---|
| 8,990,944 B1 | 3/2015 | Singh et al. | |
| 9,430,646 B1 | 8/2016 | Mushtaq et al. | |
| 9,794,287 B1 | 10/2017 | Koster et al. | |
| 2011/0271342 A1 | 11/2011 | Chung et al. | |

(Continued)

FOREIGN PATENT DOCUMENTS

| | | |
|---|---|---|
| CN | 106487633 A | 3/2017 |
| CN | 107679399 A | 2/2018 |
| EP | 3246842 A1 | 11/2017 |

OTHER PUBLICATIONS

Mishra et al. (Out-VM Monitoring for Malicious Network Packet Detection in Cloud, IEEE 2017, 10 pages) (Year: 2017).*

(Continued)

*Primary Examiner* — Oleg Korsak
(74) *Attorney, Agent, or Firm* — Stosch Sabo (57) ABSTRACT

A method, system, and computer program product for malicious virtual machine detection is provided. The method passes network traffic from a set of virtual machines to a set of network resources. The network traffic passes through a network monitor. The network monitor monitors a set of traffic characteristics for the network traffic. A change in a network traffic characteristic is identified. The change results in a modified traffic characteristic. The method identifies a first virtual machine of the set of virtual machines. The first virtual machine is associated with the modified traffic characteristics. An alert is then generated which identifies the first virtual machine and the modified traffic characteristic.

20 Claims, 6 Drawing Sheets

(56) References Cited

U.S. PATENT DOCUMENTS

2020/0183724 A1* 6/2020 Shevade ............. G06F 9/45558

OTHER PUBLICATIONS

Chandramouli (Secure Virtual Network Configuration for Virtual Machine (VM) Protection, NIST Special Publication 800-125B, Mar. 2016, 30 pages) (Year: 2016).*
Steve, "TCP/IP Ports and Sockets Explained", Ask Steve, updated May 12, 2019, 3 pages. http://www.steves-internet-guide.com/tcpip-ports-sockets/.
Gan et al., "Automated Virtual Machine Integrity Checks", U.S. Appl. No. 15/984,142, filed May 18, 2018.

* cited by examiner

MALICIOUS VIRTUAL MACHINE DETECTION

BACKGROUND

A virtual machine is an executable instance of a processing environment that may encapsulated within a virtual machine image and deployed for execution by one or more computing platforms. When instantiated and executed by a computing platform, a virtual machine may instantiate and run one or more processes and/or threads to perform work on the computing platform. Virtual machines may be cloned to generate additional virtual machines for deployment to a group of users, with each clone sharing configuration characteristics.

SUMMARY

According to an embodiment described herein, a computer-implemented method for malicious virtual machine detection is provided. The method passes network traffic from a set of virtual machines to a set of network resources. The network traffic passes through a network monitor. The network monitor monitors a set of traffic characteristics for the network traffic. A change in a network traffic characteristic is identified. The change results in a modified traffic characteristic. The method identifies a first virtual machine of the set of virtual machines. The first virtual machine is associated with the modified traffic characteristics. An alert is then generated which identifies the first virtual machine and the modified traffic characteristic.

According to an embodiment described herein, a system for malicious virtual machine detection is provided. The system includes one or more processors and a computer-readable storage medium, coupled to the one or more processors, storing program instructions that, when executed by the one or more processors, cause the one or more processors to perform operations. The system passes network traffic from a set of virtual machines to a set of network resources. The network traffic passes through a network monitor. The network monitor, a part of the system, monitors a set of traffic characteristics for the network traffic. The system identifies a change in a network traffic characteristic. The change results in a modified traffic characteristic. The system identifies a first virtual machine of the set of virtual machines. The first virtual machine is associated with the modified traffic characteristics. An alert is then generated which identifies the first virtual machine and the modified traffic characteristic.

According to an embodiment described herein a computer program product for malicious virtual machine detection is provided. The computer program product passes network traffic from a set of virtual machines to a set of network resources. The network traffic passes through a network monitor. The network monitor, implemented by the computer program product, monitors a set of traffic characteristics for the network traffic. The computer program product identifies a change in a network traffic characteristic. The change results in a modified traffic characteristic. The computer program product identifies a first virtual machine of the set of virtual machines. The first virtual machine is associated with the modified traffic characteristics. An alert is then generated which identifies the first virtual machine and the modified traffic characteristic.

DETAILED DESCRIPTION

The present disclosure relates generally to methods for network monitoring, but not exclusively, to a computer-implemented method for malicious virtual machine detection. The present disclosure relates further to a system for malicious virtual machine detection, and a computer program product for operating such a system.

In development and operations environments, new applications may be created and deployed rapidly. These environments often take advantage of virtual machines to deploy such applications. In production environments, multiple identical virtual machines may be deployed. These virtual machines may be clones of one another. For example, multiple virtual machines may be deployed in a single data center or across multiple data centers. Some or all of these deployed virtual machines may be clones.

Virtual machines may become corrupted or may be overtaken by malicious actors. Such actors may cause individual instances of virtual machines to change behaviors in subtle ways. A hacker or other malicious entity may attack, hijack, or otherwise take control of at least a portion of the functionality of one or more virtual machines. Once controlled, the malicious entity may send network traffic, from the one or more controlled virtual machines, to unauthorized network resources (e.g., servers). Once a single virtual machine is infected or controlled by a malicious entity, more virtual machines may be compromised.

Embodiments of the present disclosure describe methods, systems, and computer program products that enable automated and zero configuration methodologies to detect when virtual machines behave abnormally from a network standpoint. In some embodiments, methods, systems, and computer program products are presented which are capable of detecting abnormal network behavior of a single virtual machine or a small minority of virtual machines. Embodiments of the present disclosure compare behaviors and network traffic of virtual machines against one another. By comparing a single or small minority of virtual machines to a majority of cloned virtual machines, embodiments of the present disclosure enable generation of alerts and automated actions to stop or contain attacks before such attacks spread to larger numbers of the virtual machines or to other connected systems and network resources. Embodiments of the present disclosure enable passive monitoring of virtual machines, while taking into account appropriate variances in network traffic characteristics to avoid false alerts. While virtual machines are described, embodiments of the present disclosure apply to physical servers and other network resources.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
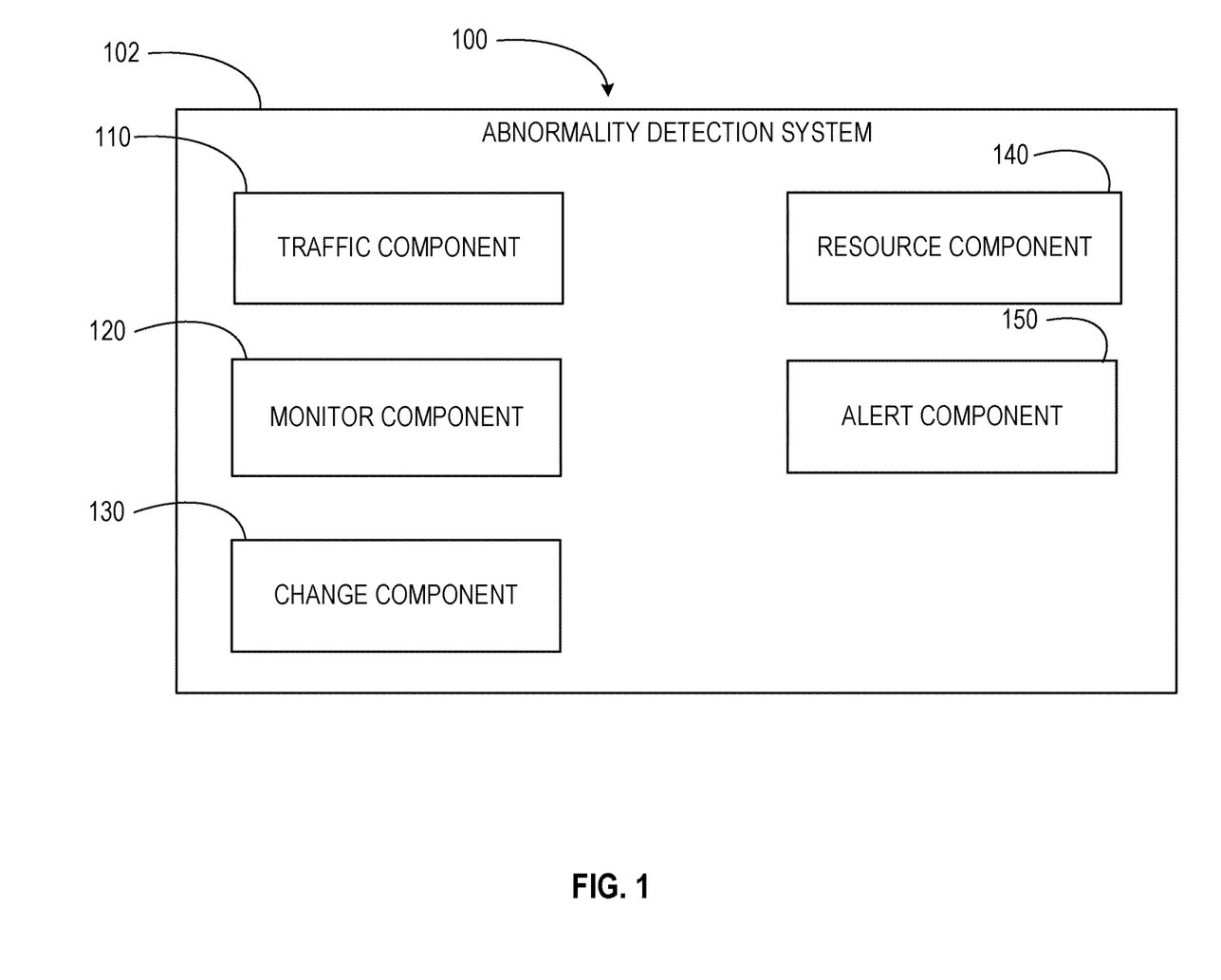
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an abnormality detection system 102. The abnormality detection system 102 may comprise a traffic component 110, a monitor component 120, a change component 130, a resource component 140, and an alert component 150. The traffic component 110 passes network traffic from a set of virtual machines to a set of network resources. The monitor component 120 monitors traffic characteristics for network traffic to and from the set of virtual machines. The change component 130 identifies changes in network traffic characteristics. The resource component 140 identifies virtual machines associated with changed or modified traffic characteristics. The alert component 150 generates alerts identifying modified traffic characteristics and associated virtual machines. Although described with distinct components, it should be understood that, in at least some embodiments, components may be combined or divided, or additional components may be added, without departing from the scope of the present disclosure.

Figure 2:
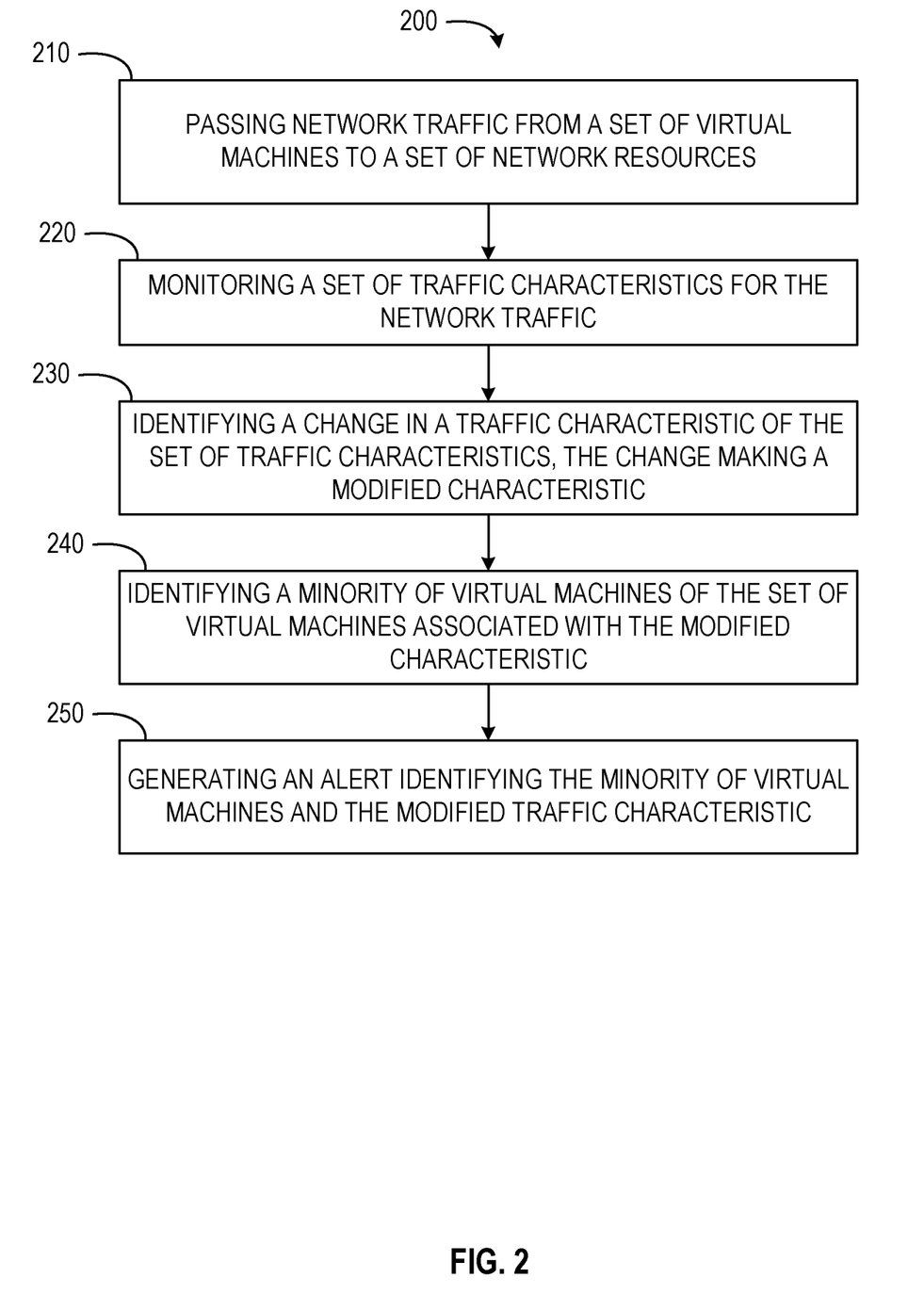
FIG. 2 depicts a flow diagram of a computer-implemented method for malicious virtual machine detection, according to at least one embodiment.

Referring now to FIG. 2, a flow diagram of a computer-implemented method 200 is shown. The computer-implemented method 200 is a method for malicious virtual machine detection. In some embodiments, the computer-implemented method 200 may be performed by one or more components of the computing environment 100, as described in more detail below.

At operation 210, the traffic component 110 passes network traffic from a set of virtual machines to a set of network resources. The traffic component 110 passes network traffic to the set of network resources through a network monitor. The traffic component 110 may pass the network traffic by routing the network traffic to the network resource or to one or more intermediate network devices between the virtual machine and the network resources.

In some embodiments, at least a portion of the set of virtual machines are clones. Cloned virtual machines may share all or substantially all of the characteristics of a parent virtual machine from which the cloned virtual machines are derived. In some embodiments, virtual machines may be associated with virtual machine identifications. Virtual machines that share a virtual machine identification communicate with the set of network resources using matching traffic characteristics. Traffic characteristics may define one or more aspects of the network traffic passing between a virtual machine and a destination network resource.

Although described with respect to virtual machines, it should be understood that the present disclosure is applicable to physical servers and other network resources. The method 200 may operate to determine changes and generate alerts relating to network traffic passing between two or more physical or logical resources accessible through a communications network and one or more communications protocols.

At operation 220, the monitor component 120 monitors a set of traffic characteristics for the network traffic. The monitor component 120 may include a network traffic monitor. In some embodiments, the network traffic monitor is a passive network traffic monitor. The network monitor may receive and monitor all network traffic between the set of virtual machines and the set of network resources. In some instances, the set of virtual machines includes three or more physical or logical network resources. The set of virtual machines may be such that a plurality of virtual machines may be used to determine an average or expected set of traffic characteristics. A change of one or more traffic characteristics used by one or more of the virtual machines (e.g., a minority of virtual machines) may indicate an inappropriate change when the remaining virtual machines (e.g., a majority of virtual machines) retain the same set of traffic characteristics.

In some embodiments, the set of traffic characteristics include one or more of a destination network address, a set of destination ports, a set of source ports, and one or more communication protocols. The set of source ports may include TCP ports and UDP ports for a source of the network traffic. The set of destination ports may include TCP ports and UDP ports for a destination of the network traffic. In some instances, the set of traffic characteristics are selected from a group consisting of a destination network address (e.g., an IP address), a set of source TCP ports, a set of destination TCP ports, a set of source UDP ports, a set of destination UDP ports, and one or more communication protocols (e.g., IP protocol). Although described with respect to a defined group, it should be understood that the monitor component 120 may monitor any one or more of the set of traffic characteristics, any combination of traffic characteristics, or all of the traffic characteristics of the set of traffic characteristics.

TCP and UDP ports used by the virtual machines may be in a range from 0 to 65535. Server side ports (e.g., source ports) may range from 0 to 49151. Client side ports (e.g., destination ports) may range from 49152 to 65535. In communications between TCP/UDP ports, one side may have a client port and the other side may have a server port. The client side port may be dynamically assigned and may be different from each connection. The server side port may remain static across different communications.

The network monitor may intercept and monitor Domain Name System (DNS) queries. In such instances, the network monitor may determine a DNS as a network destination having names or designations distinct from the DNS. Thus, the network monitor, establishing an equivalency for the address of the DNS and other related addresses may disregard the differing addresses as a source of changes within the set of traffic characteristics.

In some embodiments, the monitor component 120 monitors and records all network activity of a virtual machine with an identification of X and an IP address of Y. The monitor component 120 may generate a record for each virtual machine with the identification X, IP address Y, and time period T. The record may include a list of network activity and number of packets counted. For example, if virtual machine with identification X and IP address sent 100 packets to FTP server port 21 of IP address Z, the log may include one entry for virtual machine with identification X, IP address Y (source), IP address Z (destination), protocol type (TCP), port 21 (destination port), and count 100.

At operation 230, the change component 130 identifies a change in a traffic characteristic of the set of traffic characteristics. In some embodiments, the change results in a modified traffic characteristic. The change component 130 may identify changes in traffic characteristics by comparing expected traffic characteristics to actual values for traffic characteristics of each virtual machine of the set of virtual machines. In some embodiments, the expected traffic characteristics are traffic characteristics of a parent virtual machine from which one or more cloned virtual machines, of the set of virtual machines, are derived. In some instances, the expected traffic characteristics are predetermined and established for the set of virtual machines prior to initiating network traffic. The change component 130 may identify changes in any one or more traffic characteristics of the set of traffic characteristics. For example, the change component 130 may concurrently determine changes to one or more of a source TCP port number, a destination TCP port number, and a communication protocol for one or more of the virtual machines.

In some embodiments, one or more of the monitor component 120 and the change component 130 identifies the change by comparing a destination network address of a subset of virtual machines. The destination network address may be stored or registered in one or more log, data packet, or other transmission record for each virtual machine. The subset of virtual machines share a virtual machine identification. The change component 130 may identify the change by determining a difference in the destination network address used by one of the virtual machines when compared to the destination network address receiving network traffic from other virtual machines of the subset of virtual machines having a shared virtual machine identification. The change in the destination network address for network traffic coming from the virtual machine, suggesting that the virtual machine has been compromised.

In some embodiments, one or more of the monitor component 120 and the change component 130 identifies the change by comparing an IP protocol of a subset of virtual machines. An indication of a communication protocol (e.g., the IP protocol) may be stored or registered in a log, a data packet, or other transmission record. The change component 130 may identify the change by determining a difference in the IP protocol used by one of the virtual machines when compared to the IP protocol used by other virtual machines in the subset of virtual machines having a shared virtual machine identification. A change in IP protocol, occurring in a single or minority of virtual machines, may indicate virtual machines having a changed communications protocol have been compromised.

In some embodiments, one or more of the monitor component 120 and the change component 130 identifies the change by comparing a set of source port numbers and a set of destination port numbers of a subset of virtual machines. The source port numbers and destination port numbers may be stored or registered in logs, data packets, or other transmission records. The change component 130 may identify the change by determining a virtual machine uses a different port number (e.g., a source port number or a destination port number) to communicate with a network resource when compared to port numbers used by other virtual machines of the subset of virtual machines which have the same virtual machine identification. Changes in source port numbers or destination port numbers for an individual or minority of virtual machines may indicate a virtual machine is compromised.

At operation 240, the resource component 140 identifies a first virtual machine of the set of virtual machines, which is associated with the modified traffic characteristic. The resource component 140 may identify the first virtual machine by parsing or otherwise analyzing the log, data packet, or record indicating a changed value for one or more of the transmission characteristics. The resource component 140 may locate, within the record, a network address or other unique identifier for the first virtual machine. For example, the first virtual machine may be identified as a virtual machine located at a first network address, where the first network address occurs within a log indicating the virtual machine is using a different destination network address, port number, or IP protocol than other virtual machines of the subset of virtual machines. The resource component 140 may identify or label the virtual machine, associated with the differing traffic characteristic, as the first virtual machine. In some embodiments, the resource component 140 passes a unique identifier or label for the first virtual machine to the alert component 150. The resource component 140 may also pass the record, identifying the change, to the alert component 150.

At operation 250, the alert component 150 generates an alert identifying the first virtual machine and the modified traffic characteristic. The alert component 150 may alert one or more systems or system components where a virtual machine is sending network traffic to a different address, with different port numbers, or using differing protocols as compared to other virtual machines with the same virtual machine identification. The alert may be generated with an identifier for the first virtual machine and an indicator for the modified traffic characteristic. For example, where the modified traffic characteristic is a changed destination network address, a changed IP protocol, or a changed port number, the alert may be generated with an indicator, label, or description defining the modified traffic characteristic. In some embodiments, additional data, relating to the modified traffic characteristic, may be included in the alert. Additional data may include a time of the modification, a time the modification was detected, a value for the modified traffic characteristic (e.g., a network address or port number used for communication), data defining a network resource receiving the traffic after modification of the traffic characteristic, a change resulting in the modified traffic characteristic (e.g., an update, a communication, etc.), combinations thereof, or any other suitable and relevant information regarding the modified traffic characteristic.

By way of example, a system may have three virtual machines A, B, and C. The three virtual machines may be clones of one another. Each of the three virtual machines may generate a DNS query to site.com but receive different IP addresses from the DNS server. Virtual machine A receives 192.168.1.1, virtual machine B receives 192.168.1.2, and virtual machine C receives 192.168.1.3. The port numbers from 0 to 1023 may be known ports or server ports. Virtual machine A's IP address, TCP port 49200 to 192.168.1.1 and TCP port 21 (FTP). Virtual machine B's IP address, TCP port 49300 to 192.168.1.2 and TCP port 21 (FTP). Virtual machine C's IP address, TCP port 49400 to 192.168.1.3 and TCP port 21 (FTP). The monitor component 120 may determine the ports and DNS query responses to be equivalent.

In another example, a system has three virtual machines A, B, and C. The three virtual machines may be clones of one another. Port numbers 0 to 1023 may be known ports or server ports. Virtual machine A may communicate using its IP address, TCP port 49200 to 192.168.1.100 and TCP port 21 (FTP). Virtual machine B may communicate using its IP address, TCP port 49300 to 192.168.1.100 and TCP port 21 (FTP). During monitoring, the monitor component 120 may determine that virtual machine C communicates using its IP address, TCP port 49400 to 192.168.100 and TCP port 22 (Telnet). The monitor component 120 may determine virtual machine C uses a modified traffic characteristic. Upon identifying the modified traffic characteristic, the monitor component 120 may pass an indication of the modified traffic characteristic to the alert component 150 to generate an alert.

Figure 3:
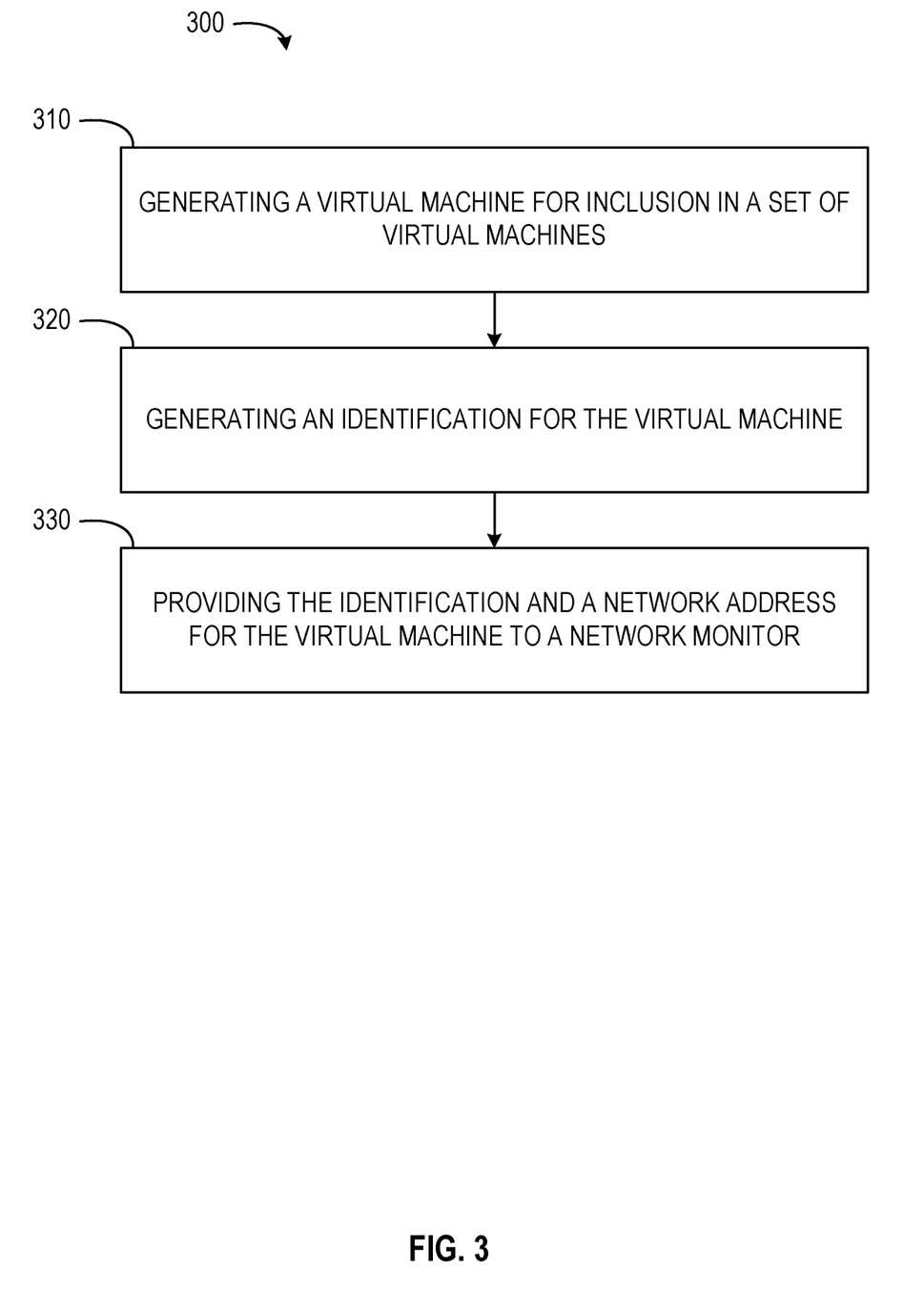
FIG. 3 depicts a flow diagram of a computer-implemented method for malicious virtual machine detection, according to at least one embodiment.

FIG. 3 shows a flow diagram of an embodiment of a computer-implemented method 300 for malicious virtual machine detection. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the resource component 140 generates a virtual machine for inclusion in a set of virtual machines. The resource component 140 may generate the virtual machine as a copy of a preexisting virtual machine. The preexisting virtual machine may be a parent virtual machine, the with newly generated virtual machine being a child virtual machine (e.g., an instance of the parent virtual machine or an image of the parent virtual machine). In some instances, the virtual machine is created as an instance of a static portion of an existing virtual machine.

In operation 320, the resource component 140 generates an identification for the virtual machine. The identification for the virtual machine may be an identification number, a name, a designation, a checksum, combinations thereof, or any other suitable or relevant identifying information. In some embodiments, the resource component 140 generates the identification by copying, transporting, or otherwise transferring an identification of a parent virtual machine to the newly created virtual machine. In some embodiments, the resource component 140 generates the identification from a static portion of the parent virtual machine. In such instances, the resource component 140 may generate the identification as a checksum, hash, or other derived identifier. In some embodiments, after generating the identification (e.g., a checksum, hash, etc.), the resource component 140 may compare the identification to an identification of the parent virtual machine. If the identification of the child virtual machine and the parent virtual machine match, the resource component 140 may validate the child virtual machine for a production environment.

In operation 330, the resource component 140 provides the identification and a network address for the virtual machine to a network monitor. The resource component 140 may identify or assign a network address for the virtual machine (e.g., the child virtual machine). The resource component 140 may identify traffic characteristics, for the virtual machine, which match the traffic characteristics of the parent virtual machine. The resource component 140 may then pass the identification, the assigned network address, and an indication of the traffic characteristics to the monitor component 120 or the network monitor. In some embodiments, the network monitor is part of the monitor component 120. Once the monitor component 120 or the network monitor receive or are provided access to a record for the virtual machine (e.g., the identification, the network address, and the traffic characteristics), the monitor component 120 or network monitor may begin monitoring network traffic passed from the virtual machine to a network resource.

In some embodiments, once the set of virtual machines are generated, a whitelist may be generated for the set of virtual machines. A record may be generated for subsets of virtual machines sharing a designation or identification (e.g., virtual machine clones). In some instances, a record is generated once three or more clones are generated. Each of the clones may be associated with a unique IP address. For each source/destination entry, a threshold number of records may exist with the source or destination as an entry prior to adding the entry to a white list. In some instances, for each source/destination entry, a percentage of unique IP addresses and at least a threshold number of unique IP addresses may be identified within records prior to adding the entry to a white list. The whitelist may be used to generate alerts when virtual machines communicate with unexpected IP addresses. The whitelist may also be used to compare with existing firewalls to test for security holes. The whitelist may be used to fine tune and close holes in firewall detection and blocking rules.

Figure 4:
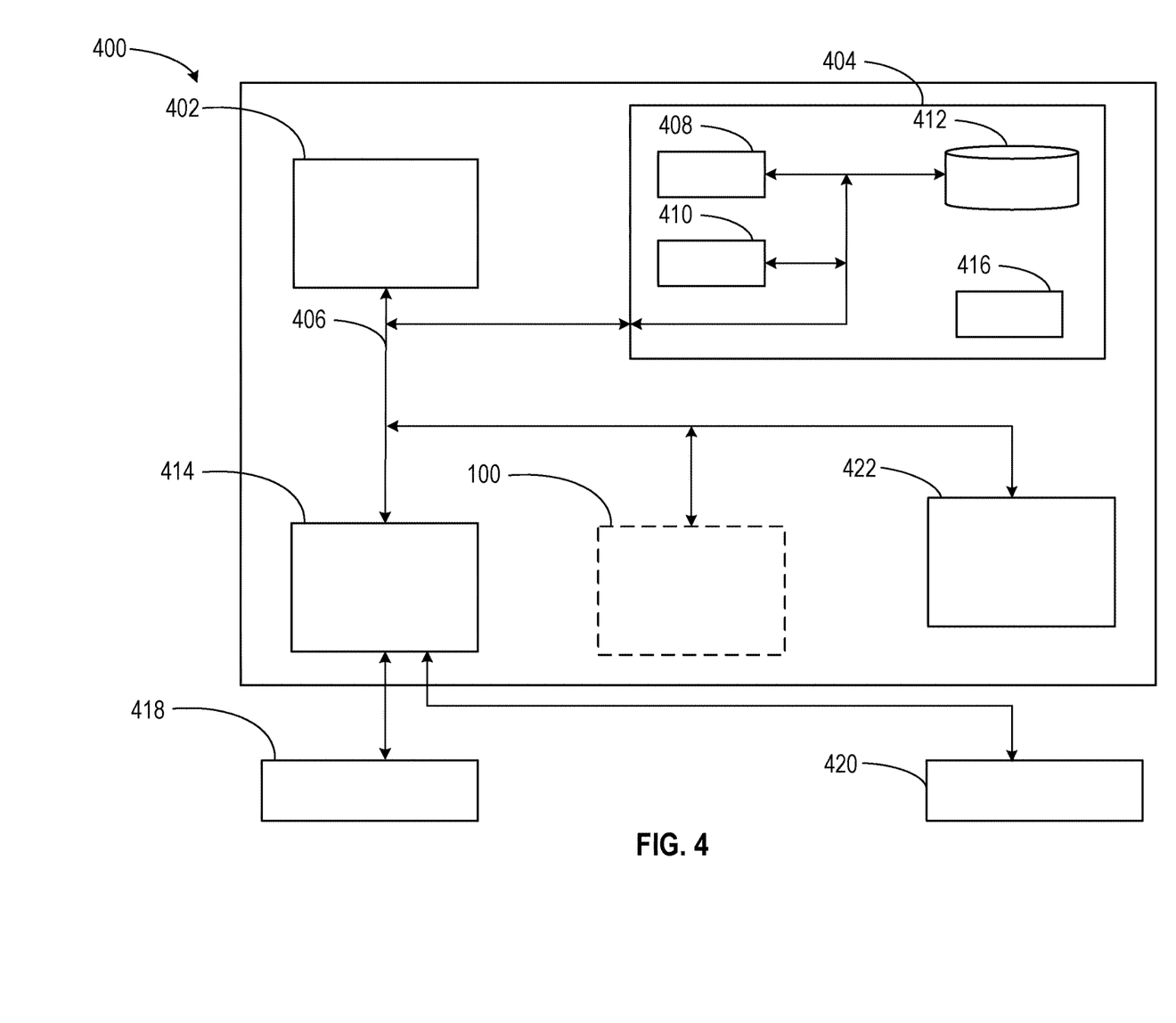
FIG. 4 depicts a block diagram of a computing system for malicious virtual machine detection, according to at least one embodiment.

Embodiments of the present disclosure may be implemented together with virtually any type of computer, regardless of the platform being suitable for storing and/or executing program code. FIG. 4 shows, as an example, a computing system 400 (e.g., cloud computing system) suitable for executing program code related to the methods disclosed herein and for malicious virtual machine detection.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the traffic component 110, the monitor component 120, the change component 130, the resource component 140, and the alert component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414.

Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
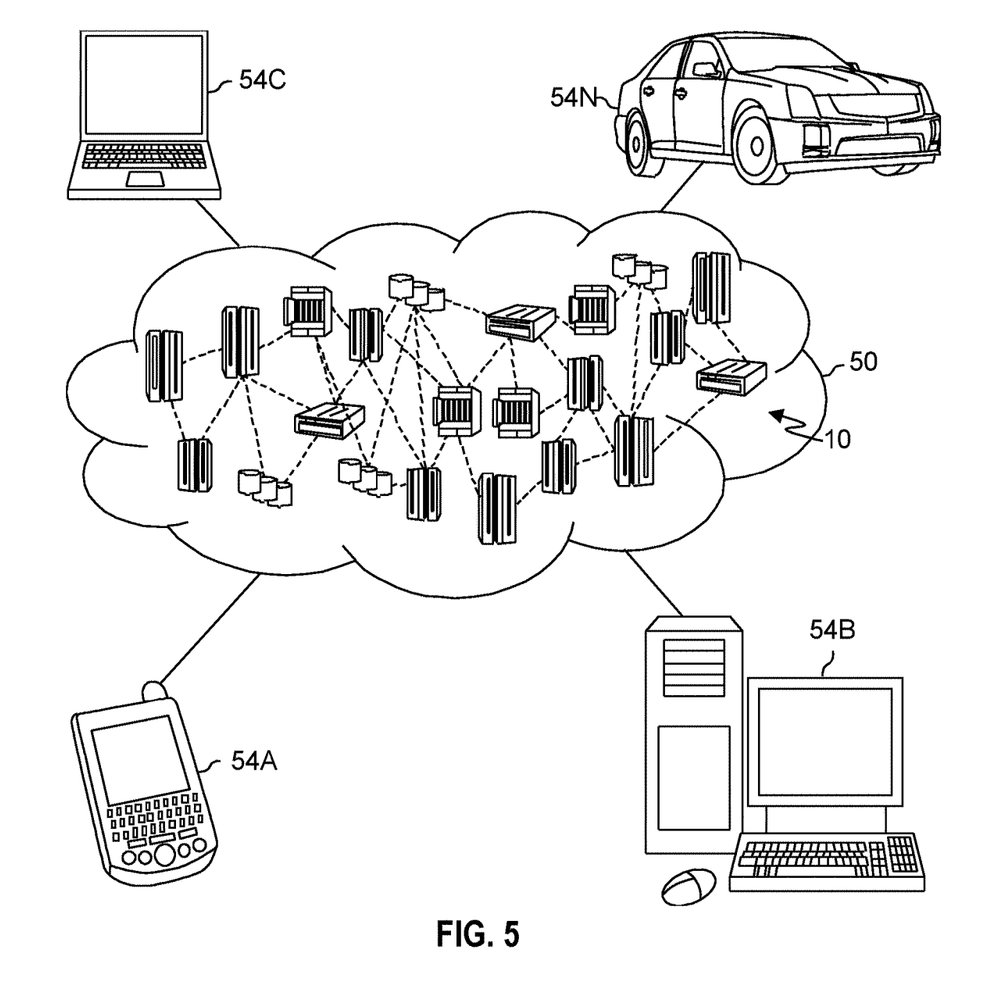
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
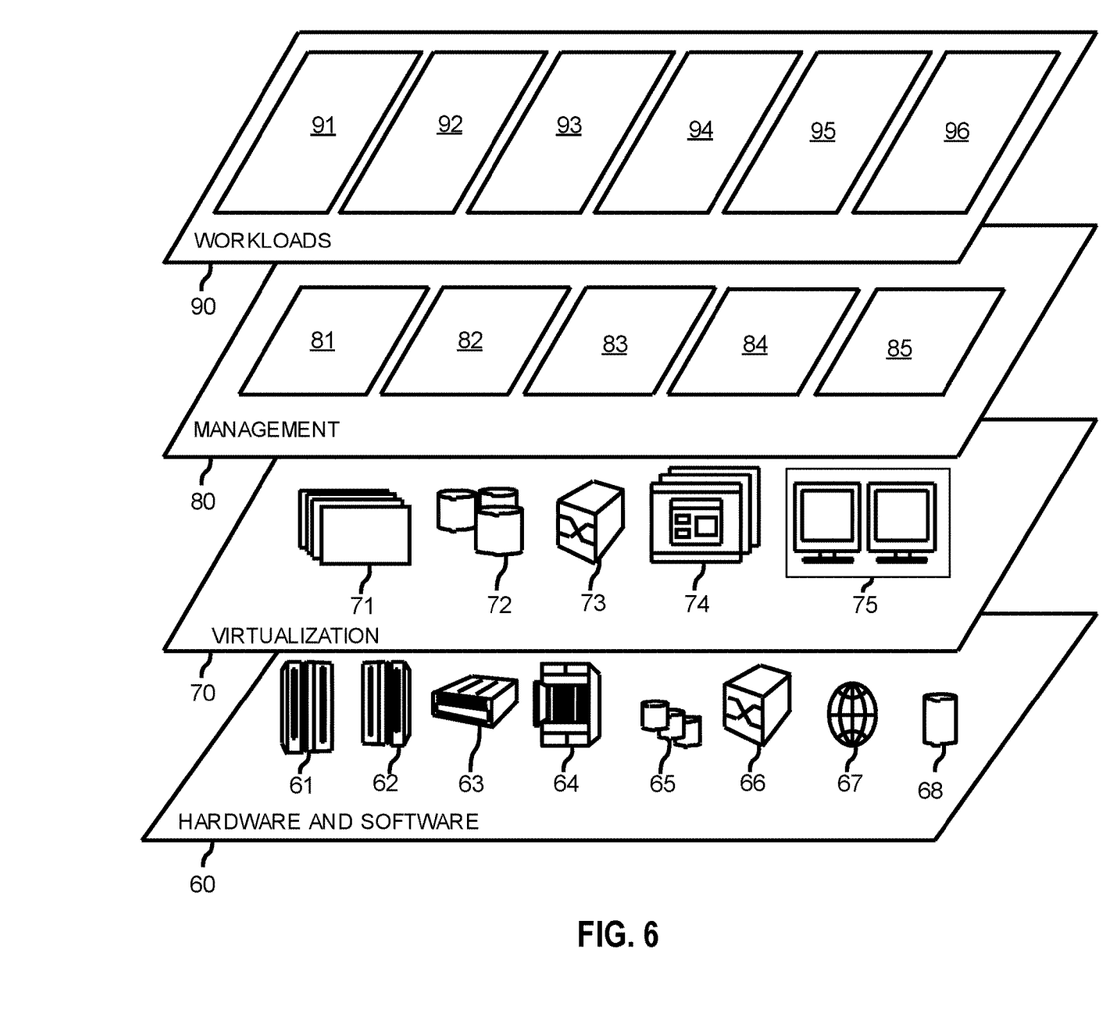
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium.

Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    passing network traffic from a set of virtual machines to a set of network resources, the network traffic passing through a network monitor;
    monitoring, by the network monitor, a set of traffic characteristics for the network traffic;
    identifying a change in a traffic characteristic of the set of traffic characteristics, the change resulting in a modified traffic characteristic, the change in traffic identified by comparing expected traffic characteristic values of parent virtual machines to actual traffic from at least a subset of virtual machines of the set of virtual machines;
    identifying a first virtual machine of the set of virtual machines, the first virtual machine associated with the modified traffic characteristic; and
    generating an alert identifying the first virtual machine and the modified traffic characteristic.

2. The method of claim 1, further comprising:
    generating a virtual machine for inclusion in the set of virtual machines;
    generating an identification for the virtual machine; and
    providing, to the network monitor, the identification and a network address for the virtual machine.

3. The method of claim 1, wherein the set of traffic characteristic are selected from a group consisting of a destination network address, a set of source TCP ports, a set of destination TCP ports, a set of source UDP ports, and a set of destination UDP ports.

4. The method of claim 1, wherein virtual machines, of the set of virtual machines, sharing a virtual machine identification communicate with the set of network resources using matching traffic characteristics of the set of traffic characteristics.

5. The method of claim 1, further comprising:
    comparing a destination network address of a subset of virtual machines sharing a virtual machine identification to identify a change in a destination network address for the first virtual machine; and
    generating the alert identifying the first virtual machine and the change in the destination network address for the first virtual machine.

6. The method of claim 1, further comprising:
    comparing a destination network address and an IP protocol of a subset of virtual machines sharing a virtual machine identification to identify a change in the IP protocol for the first virtual machine; and
    generating the alert identifying the first virtual machine and the change in the IP protocol.

7. The method of claim 1, further comprising:
    comparing a set of source port numbers and a set of destination port numbers of a subset of virtual machines sharing a virtual machine identification to identify a change in port numbers for the first virtual machine; and
    generating the alert identifying the first virtual machine and the change in port numbers.

8. A system, comprising:
    one or more processors; and
    a computer-readable storage medium, coupled to the one or more processors, storing program instructions that, when executed by the one or more processors, cause the one or more processors to perform operations comprising:
        passing network traffic from a set of virtual machines to a set of network resources, the network traffic passing through a network monitor;
        monitoring, by the network monitor, a set of traffic characteristics for the network traffic;
        identifying a change in a traffic characteristic of the set of traffic characteristics, the change resulting in a modified traffic characteristic, the change in traffic identified by comparing expected traffic characteristic values of parent virtual machines to actual traffic from at least a subset of virtual machines of the set of virtual machines;
        identifying a first virtual machine of the set of virtual machines, the first virtual machine associated with the modified traffic characteristic; and
        generating an alert identifying the first virtual machine and the modified traffic characteristic.

9. The system of claim 8, wherein the operations further comprise:
    generating a virtual machine for inclusion in the set of virtual machines;
    generating an identification for the virtual machine; and
    providing, to the network monitor, the identification and a network address for the virtual machine.

10. The system of claim 8, wherein the set of traffic characteristic are selected from a group consisting of a destination network address, a set of source TCP ports, a set of destination TCP ports, a set of source UDP ports, and a set of destination UDP ports.

11. The system of claim 8, wherein virtual machines, of the set of virtual machines, sharing a virtual machine identification communicate with the set of network resources using matching traffic characteristics of the set of traffic characteristics.

12. The system of claim 8, wherein the operations further comprise:
comparing a destination network address of a subset of virtual machines sharing a virtual machine identification to identify a change in a destination network address for the first virtual machine; and
generating the alert identifying the first virtual machine and the change in the destination network address for the first virtual machine.

13. The system of claim 8, wherein the operations further comprise:
comparing a destination network address and an IP protocol of a subset of virtual machines sharing a virtual machine identification to identify a change in the IP protocol for the first virtual machine; and
generating the alert identifying the first virtual machine and the change in the IP protocol.

14. The system of claim 8, wherein the operations further comprise:
comparing a set of source port numbers and a set of destination port numbers of a subset of virtual machines sharing a virtual machine identification to identify a change in port numbers for the first virtual machine; and
generating the alert identifying the first virtual machine and the change in port numbers.

15. A computer program product comprising a computer readable storage medium having program instructions embodied therewith, the program instructions being executable by one or more processors to cause the one or more processors to perform operations comprising:
passing network traffic from a set of virtual machines to a set of network resources, the network traffic passing through a network monitor;
monitoring, by the network monitor, a set of traffic characteristics for the network traffic;
identifying a change in a traffic characteristic of the set of traffic characteristics, the change resulting in a modified traffic characteristic, the change in traffic identified by comparing expected traffic characteristic values of parent virtual machines to actual traffic from at least a subset of virtual machines of the set of virtual machines;
identifying a first virtual machine of the set of virtual machines, the first virtual machine associated with the modified traffic characteristic; and
generating an alert identifying the first virtual machine and the modified traffic characteristic.

16. The computer program product of claim 15, wherein the operations further comprise:
generating a virtual machine for inclusion in the set of virtual machines;
generating an identification for the virtual machine; and
providing, to the network monitor, the identification and a network address for the virtual machine.

17. The computer program product of claim 15, wherein virtual machines, of the set of virtual machines, sharing a virtual machine identification communicate with the set of network resources using matching traffic characteristics of the set of traffic characteristics.

18. The computer program product of claim 15, wherein the operations further comprise:
comparing a destination network address of a subset of virtual machines sharing a virtual machine identification to identify a change in a destination network address for the first virtual machine; and
generating the alert identifying the first virtual machine and the change in the destination network address for the first virtual machine.

19. The computer program product of claim 15, wherein the operations further comprise:
comparing a destination network address and an IP protocol of a subset of virtual machines sharing a virtual machine identification to identify a change in the IP protocol for the first virtual machine; and
generating the alert identifying the first virtual machine and the change in the IP protocol.

20. The computer program product of claim 15, wherein the operations further comprise:
comparing a set of source port numbers and a set of destination port numbers of a subset of virtual machines sharing a virtual machine identification to identify a change in port numbers for the first virtual machine; and
generating the alert identifying the first virtual machine and the change in port numbers.

\* \* \* \* \*